(12) United States Patent
Carter

(10) Patent No.: US 10,872,489 B1
(45) Date of Patent: Dec. 22, 2020

(54) COMFORT ACCESSORY VENDING APPARATUS

(71) Applicant: Reggie Carter, Long Beach, CA (US)

(72) Inventor: Reggie Carter, Long Beach, CA (US)

( * ) Notice: Subject to any disclaimer, the term of this patent is extended or adjusted under 35 U.S.C. 154(b) by 0 days.

(21) Appl. No.: 16/582,390

(22) Filed: Sep. 25, 2019

(51) Int. Cl.
*G07F 11/42* (2006.01)

(52) U.S. Cl.
CPC .................................. *G07F 11/42* (2013.01)

(58) Field of Classification Search
CPC .......... G07F 11/10; G07F 11/24; G07F 11/42; G07F 11/62; G07F 17/00
See application file for complete search history.

(56) References Cited

U.S. PATENT DOCUMENTS

| | | | |
|---|---|---|---|
| 1,741,572 A | 12/1929 | Jones | |
| 3,178,055 A * | 4/1965 | Schuller | G07F 11/42 221/75 |
| 3,269,595 A * | 8/1966 | Krakauer | G07F 11/42 221/75 |
| 3,831,807 A * | 8/1974 | Deaton | G07F 11/58 221/85 |
| D244,480 S * | 5/1977 | Burck | D20/6 |
| 4,023,704 A * | 5/1977 | Pitel | G07F 5/18 221/75 |
| 4,149,653 A * | 4/1979 | Lennartson | G07F 11/56 221/75 |
| 5,097,986 A * | 3/1992 | Domberg | G07F 9/105 221/130 |
| 5,236,103 A * | 8/1993 | Ficken | G07F 11/24 221/124 |
| 6,019,249 A * | 2/2000 | Michael | G07F 11/42 221/155 |
| 6,021,626 A | 2/2000 | Goodman | |
| 6,202,888 B1 * | 3/2001 | Pollock | G07F 11/36 221/1 |
| D442,994 S | 5/2001 | Hanyuda | |
| 6,330,958 B1 * | 12/2001 | Ruskin | G06Q 30/06 221/197 |
| 7,424,757 B2 | 9/2008 | Paul | |
| 7,844,363 B1 | 11/2010 | Mehdizadeh | |
| 10,413,093 B2 * | 9/2019 | Alletto | A47F 5/108 |
| 2002/0017531 A1 * | 2/2002 | Adriani | G07F 11/36 221/15 |
| 2005/0087544 A1 * | 4/2005 | Skavnak | G07F 11/42 221/75 |
| 2008/0270157 A1 | 10/2008 | Read | |

(Continued)

*Primary Examiner* — Gene O Crawford
*Assistant Examiner* — Kelvin L Randall, Jr.

(57) ABSTRACT

A comfort accessory vending apparatus for selling comfort products for overnight travel includes a housing and a door with a viewing window hingingly coupled to an open housing front side. A push flap is hingingly coupled to a receiving aperture to selectively grant access to a housing inside. Dispenser shelves are coupled to the housing and comprise a shelf body and a plurality of motorized retrieval tracks. Helical rods are coupled to a motor and secure a plurality of sleeping comfort items between adjacent turns of the helical rods. The motor rotates the helical rods to advance the plurality of sleeping comfort items. A payment interface is coupled to the door and is in operational communication with a control unit to receive payment and allow a user to select the desired sleeping comfort item to be dispensed.

9 Claims, 4 Drawing Sheets

(56) References Cited

U.S. PATENT DOCUMENTS

| | | | | |
|---|---|---|---|---|
| 2011/0049067 A1* | 3/2011 | Garson | .................. | A47F 1/126 |
| | | | | 211/59.3 |
| 2014/0195041 A1* | 7/2014 | Hoormann | ............ | G07F 11/005 |
| | | | | 700/232 |
| 2015/0026099 A1* | 1/2015 | Alletto, Jr. | ............. | G06Q 90/00 |
| | | | | 705/500 |
| 2015/0034510 A1* | 2/2015 | Crane | ..................... | B65B 25/20 |
| | | | | 206/278 |
| 2019/0122479 A1* | 4/2019 | Staev | ..................... | G07F 11/42 |

* cited by examiner

COMFORT ACCESSORY VENDING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to vending devices and more particularly pertains to a new vending device for selling comfort products for overnight travel.

(2) Description of Related Art Including Information Disclosed Under 37 CFR 1.97 and 1.98

The prior art relates to vending devices.

BRIEF SUMMARY OF THE INVENTION

An embodiment of the disclosure meets the needs presented above by generally comprising a housing having an open housing front side separated from a housing back side, a housing left side separated from a housing right side, and a housing top side separated from a housing bottom side to define a housing inside. A door is hingingly coupled to the housing front side. The door has a transparent viewing window and a receiving aperture extending through to the housing inside proximal the housing bottom side. A push flap is hingingly coupled to the receiving aperture to selectively grant access to the housing inside. A plurality of dispenser shelves is coupled to the housing. Each dispenser shelf comprises a shelf body coupled to the housing and a plurality of motorized retrieval tracks. The shelf body is perpendicularly coupled to the housing back side within the housing inside and extends from the housing left side to the housing right side. The shelf body has a front edge spaced apart from the door to define a fall chute. Each retrieval track has a motor and at least one helical rod coupled to the motor. The helical rods are rotatable and configured to secure a plurality of sleeping comfort items between adjacent turns of the helical rods. The motor rotates the helical rods to advance the plurality of sleeping comfort items towards the front edge of the shelf body until a front-most sleeping comfort item is dispensed down the fall chute. A control unit is coupled to the housing and is in operational communication with the motor of each retrieval track. A payment interface is coupled to the door and is in operational communication with the control unit to receive payment and allow a user to select the desired sleeping comfort item to be dispensed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
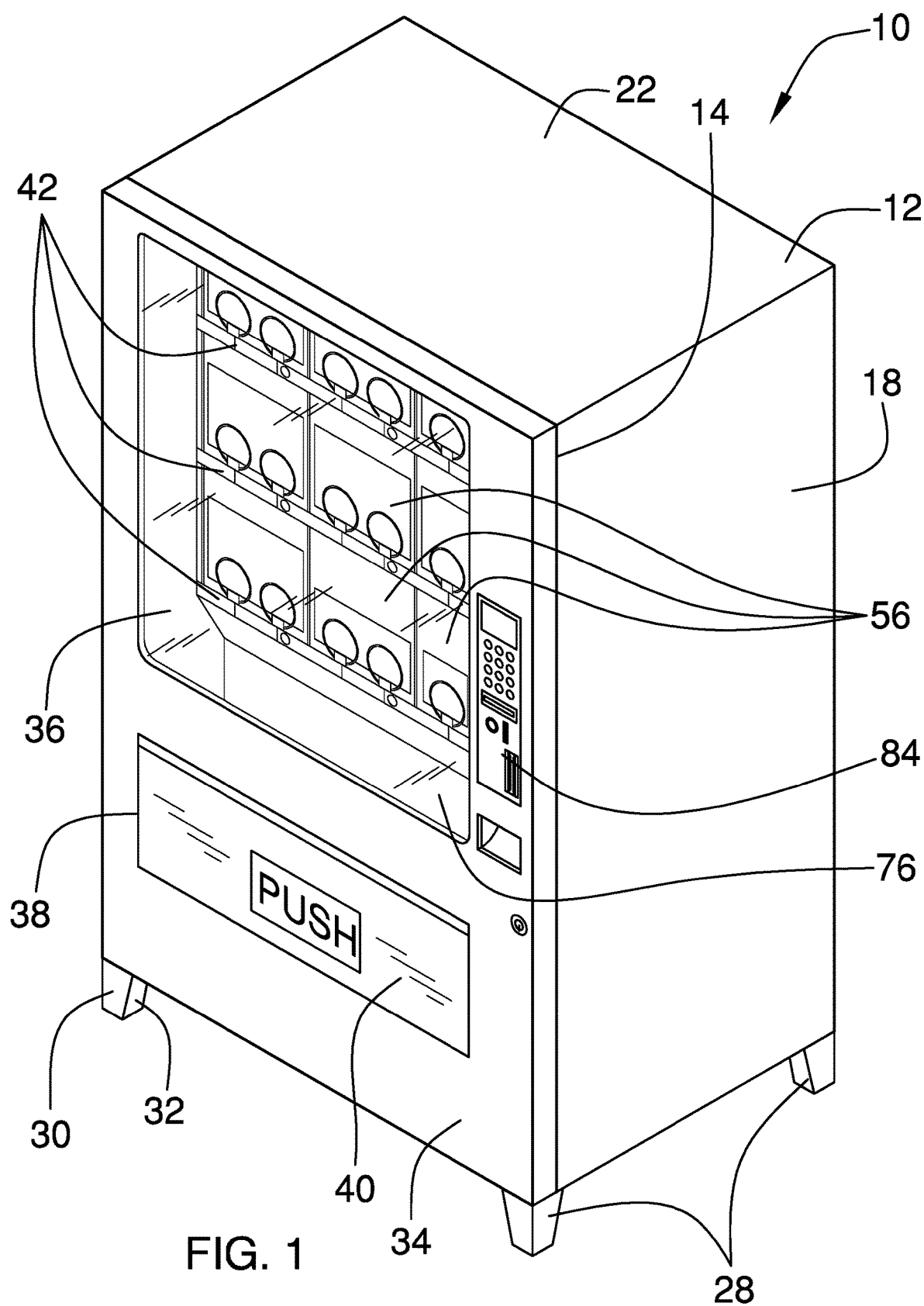
FIG. 1 is an isometric view of a comfort accessory vending apparatus according to an embodiment of the disclosure.
Figure 2:
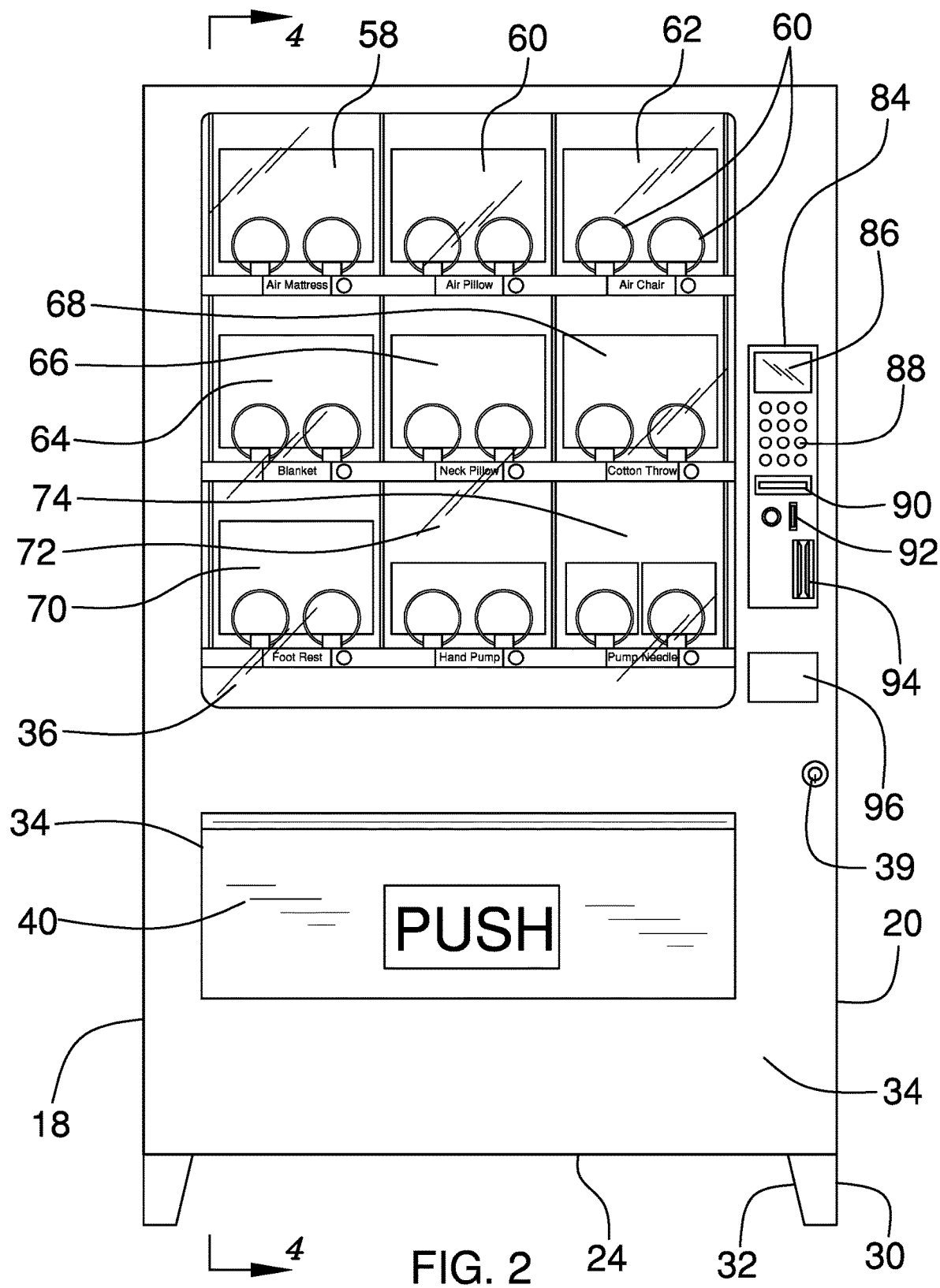
FIG. 2 is a front elevation view of an embodiment of the disclosure.
Figure 3:
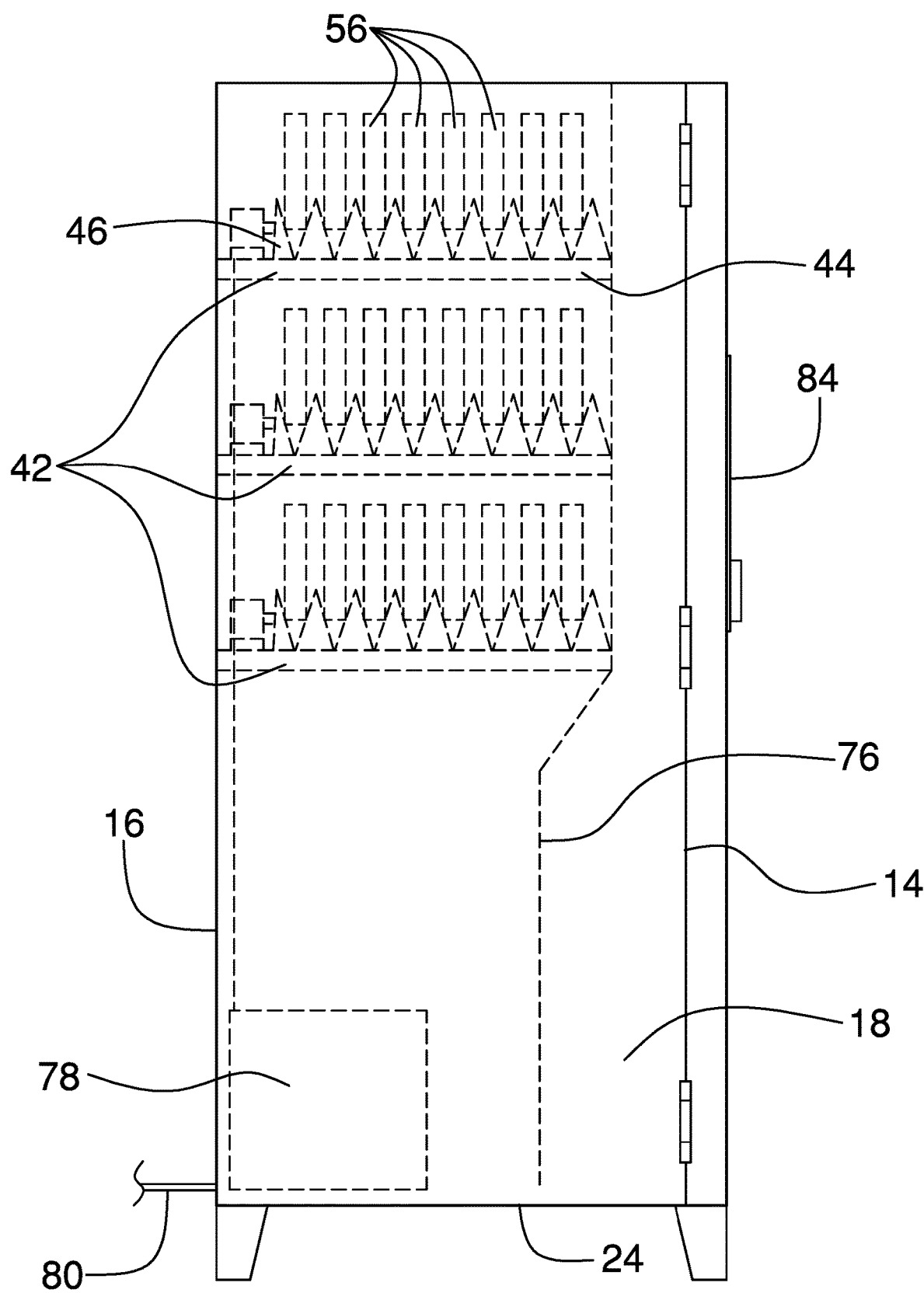
FIG. 3 is a side elevation view of an embodiment of the disclosure.
Figure 4:
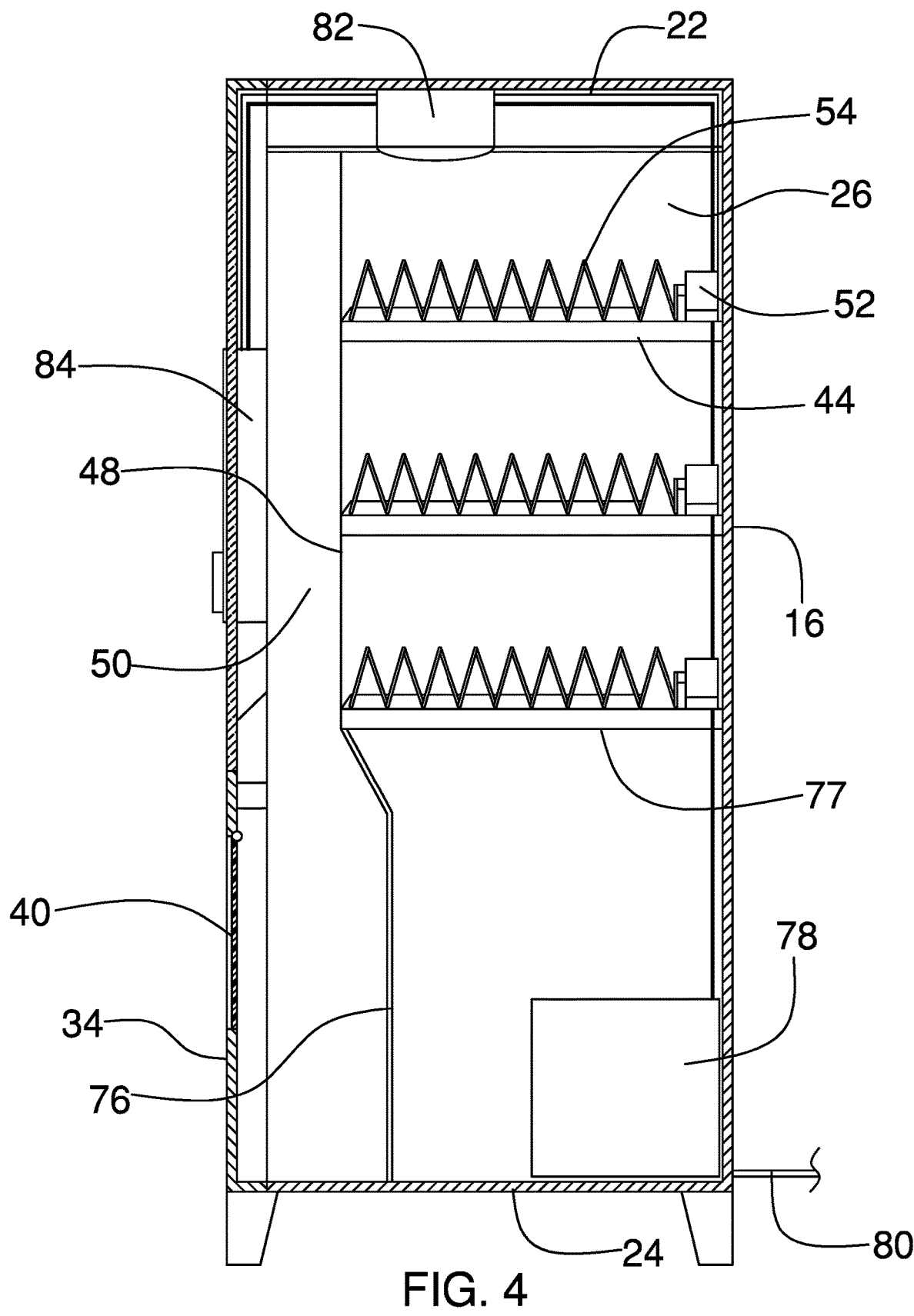
FIG. 4 is a cross-sectional view of an embodiment of the disclosure along the line 4-4 of FIG. 2.

With reference now to the drawings, and in particular to FIGS. 1 through 4 thereof, a new vending device embodying the principles and concepts of an embodiment of the disclosure and generally designated by the reference numeral 10 will be described.

As best illustrated in FIGS. 1 through 4, the comfort accessory vending apparatus 10 generally comprises a housing 12 having an open housing front side 14 separated from a housing back side 16 a housing left side 18 separated from a housing right side 20, and a housing top side 22 separated from a housing bottom side 24 to define a housing inside 26. A plurality of feet 28 is coupled to the housing bottom side 24. Each foot of the plurality of feet 28 may have a vertical outer edge 30 and a pair of angled inner faces 32 for increased structural integrity. A door 34 is hingingly coupled to the housing front side 36. The door 34 has a transparent viewing window 36 and a receiving aperture 38 extending through to the housing inside 26 proximal the housing bottom side 24. The door 34 has a lock 39 to seal the housing front side 14. A push flap 40 is hingingly coupled to the receiving aperture 38 to selectively grant access to the housing inside 26.

A plurality of dispenser shelves 42 is coupled to the housing 12. Each dispenser shelf 42 comprises a shelf body 44 coupled to the housing 12 and a plurality of motorized retrieval tracks 46. There may be three retrieval racks 46. The shelf body 44 is perpendicularly coupled to the housing back side 16 within the housing inside 26 and extends from the housing left side 18 to the housing right side 20. The shelf body 44 has a front edge 48 spaced apart from the door 34 and defines a fall chute 50. Each retrieval track 46 has a motor 52 and at least one helical rod 54 coupled to the motor 52. There may be a pair of helical rods 54 coupled to each motor 52. The helical rods 54 are rotatable and configured to secure a plurality of sleeping comfort items 56 between adjacent turns of the helical rods 54. The motor 52 rotates the helical rods 54 to advance the plurality of sleeping comfort items 56 towards the front edge 48 of the shelf body until a front-most sleeping comfort item 56 is dispensed down the fall chute 50. The plurality of sleeping comfort items 56 may comprise an air mattress 58, an air pillow 60, an air chair 62, a blanket 64, a neck pillow 66, a cotton throw 68, a foot rest 70, a hand pump 72, and a pump needle 74. A separator plate 76 may be coupled to the housing bottom side 24 within the housing inside and extends to the front edge 48 of the shelf body 44 of a lowest dispenser shelf 77 of the plurality of dispenser shelves 42. The separator plate may have an angled portion adjacent the lowest dispenser shelf 77 to widen the fall chute 50 towards the housing bottom side 24.

A control unit 78 is coupled to the housing 12 and is in operational communication with the motor 52 of each retrieval track. The control unit 78 has a power supply 80. A light 82 may be coupled to the housing top side 22 within the housing inside 26 and is in operational communication with the control unit 78. A payment interface 84 is coupled to the door 34. The payment interface 84 is in operational communication with the control unit 78 to receive payment and allow a user to select the desired sleeping comfort item 56 to be dispensed. The payment interface 84 comprises a display screen 86, a keypad 88, a bill receptacle 90, a coin receptacle 92, a credit card reader 94, and a coin dispenser 86.

In use, the selects the desired sleeping comfort item 56 with the keypad 88 and the display screen 86 then inserts the required payment. The motor 52 of the retrieval track 46 with the chosen item 56 then rotates the helical rods 54 to dispense the item 56 down the fall chute 50 to the housing bottom side 24. The push flap 40 is then pushed open to retrieve the item 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A comfort accessory vending apparatus comprising:
   a housing, the housing having an open housing front side separated from a housing back side, a housing left side separated from a housing right side, and a housing top side separated from a housing bottom side defining a housing inside;
   a door coupled to the housing, the door being hingingly coupled to the housing front side, the door having a transparent viewing window and a receiving aperture extending through to the housing inside proximal the housing bottom side;
   a push flap coupled to the door, the push flap being hingingly coupled to the receiving aperture to selectively grant access to the housing inside;
   a plurality of dispenser shelves coupled to the housing, each dispenser shelf comprising:
      a shelf body coupled to the housing, the shelf body being perpendicularly coupled to the housing back side within the housing inside and extending from the housing left side to the housing right side, the shelf body having a front edge spaced apart from the door and defining a fall chute; and
      a plurality of motorized retrieval tracks, each retrieval track having a motor and at least one helical rod coupled to the motor, the helical rods being rotatable and configured to secure a plurality of sleeping comfort items between adjacent turns of the helical rods, the motor rotating the helical rods to advance the plurality of sleeping comfort items towards the front edge of the shelf body until a front-most sleeping comfort item is dispensed down the fall chute;
   a control unit coupled to the housing, the control unit being in operational communication with the motor of each retrieval track;
   a payment interface coupled to the door, the payment interface being in operational communication with the control unit to receive payment and allow a user to select the desired sleeping comfort item to be dispensed; and
   the plurality of sleeping comfort items comprising an air mattress, an air pillow, an air chair, a blanket, a neck pillow, a cotton throw, a foot rest, a hand pump, and a pump needle.

2. The comfort accessory vending apparatus of claim 1 further comprising each helical rod being a pair of helical rods.

3. The comfort accessory vending apparatus of claim 1 further comprising the payment interface having a display screen, a keypad, a bill receptacle, a coin receptacle, a credit card reader, and a coin dispenser.

4. The comfort accessory vending apparatus of claim 1 further comprising a plurality of feet coupled to the housing, the plurality of feet being coupled to the housing bottom side.

5. The comfort accessory vending apparatus of claim 4 further comprising each foot of the plurality of feet having a vertical outer edge and a pair of angled inner faces.

6. The comfort accessory vending apparatus of claim 1 further comprising the plurality of dispenser shelves being three dispenser shelves.

7. The comfort accessory vending apparatus of claim 6 further comprising each dispenser shelf having three retrieval tracks.

8. The comfort accessory vending apparatus of claim 1 further comprising a separator plate coupled to the housing, the separator plate being coupled to the housing bottom side within the housing inside and extending to the front edge of the shelf body of a lowest dispenser shelf of the plurality of dispenser shelves.

9. A comfort accessory vending apparatus comprising:
- a housing, the housing having an open housing front side separated from a housing back side, a housing left side separated from a housing right side, and a housing top side separated from a housing bottom side defining a housing inside;
- a plurality of feet coupled to the housing, the plurality of feet being coupled to the housing bottom side, each foot of the plurality of feet having a vertical outer edge and a pair of angled inner faces;
- a door coupled to the housing, the door being hingingly coupled to the housing front side, the door having a transparent viewing window and a receiving aperture extending through to the housing inside proximal the housing bottom side;
- a push flap coupled to the door, the push flap being hingingly coupled to the receiving aperture to selectively grant access to the housing inside;
- a plurality of dispenser shelves coupled to the housing, each dispenser shelf comprising:
  - a shelf body coupled to the housing, the shelf body being perpendicularly coupled to the housing back side within the housing inside and extending from the housing left side to the housing right side, the shelf body having a front edge spaced apart from the door and defining a fall chute; and
  - a plurality of motorized retrieval tracks, each retrieval track having a motor and at least one helical rod coupled to the motor, each helical rod being a pair of helical rods, the helical rods being rotatable and configured to secure a plurality of sleeping comfort items between adjacent turns of the helical rods, the motor rotating the helical rods to advance the plurality of sleeping comfort items towards the front edge of the shelf body until a front-most sleeping comfort item is dispensed down the fall chute;
  - wherein the plurality of sleeping comfort items comprises an air mattress, an air pillow, an air chair, a blanket, a neck pillow, a cotton throw, a foot rest, a hand pump, and a pump needle;
- a separator plate coupled to the housing, the separator plate being coupled to the housing bottom side within the housing inside and extending to the front edge of the shelf body of a lowest dispenser shelf of the plurality of dispenser shelves;
- a control unit coupled to the housing, the control unit being in operational communication with the motor of each retrieval track; and
- a payment interface coupled to the door, the payment interface being in operational communication with the control unit to receive payment and allow a user to select the desired sleeping comfort item to be dispensed, the payment interface having a display screen, a keypad, a bill receptacle, a coin receptacle, a credit card reader, and a coin dispenser.

* * * * *